Dec. 24, 1940.    J. S. MAZE    2,226,006

CORRUGATED METAL FASTENER

Filed Nov. 23, 1936

Inventor
James S. Maze
By Ambro, Thies, Olson & Mechenburger
Attys.

Patented Dec. 24, 1940

2,226,006

UNITED STATES PATENT OFFICE 2,226,006

CORRUGATED METAL FASTENER

James S. Maze, Peru, Ill., assignor to W. H. Maze Company, Peru, Ill., a corporation of Illinois Application November 23, 1936, Serial No. 112,216

14 Claims. (Cl. 85—28)

This invention relates to fasteners, with particular relation to fasteners for securing in place corrugated metal or simliar material such as so-called V-crimp sheet metal used as roofing material or for side wall construction.

Corrugated metal or similar material used for building purposes is usually made of galvanized iron or similar comparatively tough material, and may be secured in place by means of ordinary nails driven through the ccrrugated metal and into the wooden sheathing or roof boards. Ordinary nails, however, are unsatisfactory for this purpose, for several reasons, for instance, the shank does not have sufficient holding power; also, the opening formed by the shank when driven through the corrugated iron is usually slightly larger than the nail, and cannot be properly sealed by the ordinary nail head. Therefore, moisture may enter under the head and around the shank and ultimately destroy the sheathing and also cause the nails to rust and the metal will no longer be held securely in place. The strains caused by expansion and contraction of the material cause the nails to be loosened and sometimes entirely removed, a condition commonly known as "backing out," "popping," or "drawing," thereby allowing the corrugated material to become loose and permitting water to enter through the nail holes.

In order to avoid some of the above mentioned objections to the use of ordinary nails, it has become common practice to use nails having greatly enlarged heads made of soft material. These enlarged heads may be formed by pressing or molding lead or similar material around the normal head of the nail, thereby providing an enlarged head of soft material usually having a tapered portion extending a short distance down the shank of the nail to effectively seal the nail hole. These lead heads are preferably dished on the under side, or provided with an annular depending peripheral flange, whereby when they are driven snugly in place, the tapered portion adjacent the shank will completely close the nail hole and the flange will be distorted to fit the surface contour of the corrugated metal and the entire periphery of the head will be snugly in contact with the curved surface of the corrugated material. The lead head thereby forms an effective seal around and underneath the head proper of the nail, as long as the nail does not "pop" or "draw."

In driving these so-called lead head nails, there is of course a tendency to flatten and distort the lead portion of the head, and it has been found in practice that if the shank is provided with any means for increasing the holding power of the nail, and if this means rotates the nail while it is being driven in place, the lead portion of the head will become loosened from the nail head proper because of the combined action of the rotary movement, the distortion of the lead by the hammer blows, and the resistance of the head to rotation. It is apparent that if the nail is to be effective in use the head must stay snugly in position.

Many expedients have been resorted to in attempting to provide the shank with more holding power. High pitched threads which cause the nail to turn as it is being driven in have been used. However, it has been found that because of the loosening of the head when such threads were used and the gradual "easing" out of the nails under stress, the nails are very unsatisfactory, and therefore it has been common practice to merely form barbs on the shanks to provide projections or a roughened surface which it was thought tended to increase the holding power. However, the increased holding power has been very slight and the barbs make an irregular hole through the corrugated metal. It is therefore an object of the present invention to provide a fastener for corrugated metal in which the shank is provided with means for greatly increasing the holding power of the nail without causing rotation of the nail when it is being driven in place and without material destruction of the wood fibers, whereby the nails may be used to secure sheet metal to very thin sheathing of various types, with sufficient holding power to retain the covering snugly in place and prevent leakage under extreme weather conditions and over long periods of time.

In order to meet the requirements of established standards in the trade, it is desirable to provide nails in which each standard gauge and corresponding length will meet standard tests as to cross sectional strength and which will provide a predetermined "count" per pound. If the material of the shank is cut away or it is reduced in cross section at certain points, to increase holding power, then the size or gauge of the shank must be increased to provide standard cross sectional strength. If this is done the count per pound is reduced and the stock or total amount of material used for a predetermined count is increased, which adds materially to the manufacturing and transportation costs.

It is therefore a very important object of the present invention to provide a nail of the character described having materially increased holding power and which will satisfactorily meet standard requirements with respect to gauge of stock, cross sectional strength, and count per pound.

As previously stated, nails with high pitch threads tend to ease out. That is, the strains caused by expansion of the roofing and other conditions cause the nails to rotate backward slightly and they gradually work out sufficiently to loosen the roof covering and also to permit moisture to enter through the opening around the nail shank. It is therefore an object of this invention to provide a nail which will not ease out but which will remain fixed in holding position until a pull equivalent to its maximum holding power is applied.

In order to prevent rust, it is desirable to galvanize nails of this type. However, it has been found that if ordinary annular grooves are provided in the shank to increase holding power, the nails cannot be properly galvanized for the reason that the galvanized material does not flow evenly over the surface, nor does the surplus metal drain freely, but instead accumulates in these annular grooves, and therefore the coating is very rough and uneven and tends to destroy the wood fibers and prevent their engaging in the grooves. The galvanizing material tends to more or less completely fill such grooves and forms a rough and uneven surface over the shank of the nail.

Sheathing has been materially reduced in thickness as compared to old standards, and a new type of sheathing comprising laminated wood has lately been introduced in an effort to reduce the thickness to a minimum consistent with strength. The laminated sheathing is made of a plurality of thin sheets of wood which may be veneer and which are glued together with the grain of adjacent sheets in crosswise relation. Sheathing of this type is sometimes as thin as five-sixteenths of an inch and it is essential that the nails used should have maximum holding power, as only a small area of the nail is engaged by the wood fibers. The present invention contemplates a nail particularly adapted for use with such thin sheathing and having materially increased holding power in proportion to the area engaged by the wood fibers.

The present invention, therefore, provides a highly efficient means for increasing the holding power of the shank of the nail while retaining all of the advantages of the lead head, and also provides a construction which may be easily galvanized with a substantially uniform coating.

Further objects will be apparent from the specification and the appended claims.

Figure 1:
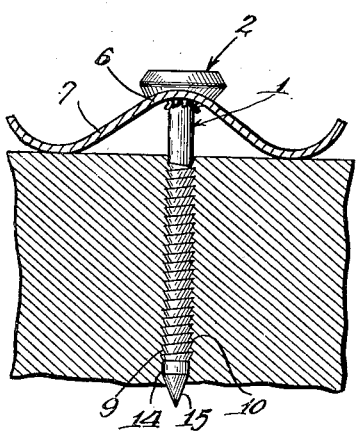
Figure 1 is a transverse sectional view through a section of corrugated metal as applied to an ordinary roof or wall by means of the improved fastener.
Figure 2:
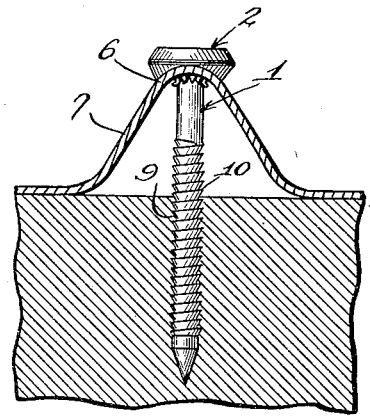
Fig. 2 is a sectional view similar to Fig. 1 but illustrates the nail as used in connection with V-crimp sheet metal covering.
Figure 3:
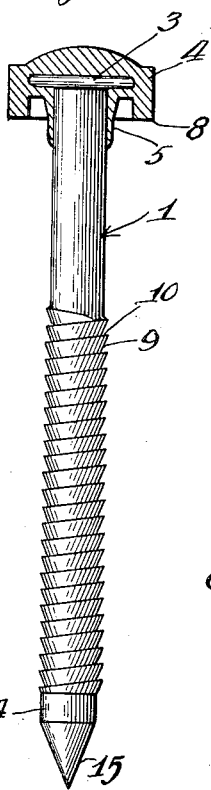
Fig. 3 is a side elevation of one of the nails with the lead head shown in section.

Referring to the drawing in detail, the embodiment illustrated comprises a lead head nail having a shank portion indicated generally by the reference character 1, and having an enlarged head 2. The shank portion 1 is provided with a comparatively small-diameter, flat nail head 3, which latter is completely enclosed in a lead shell or casing 4. This lead shell or casing is snugly pressed or molded on the nail and is preferably provided with a downwardly extending tapered portion 5 snugly engaging the upper end of the nail shank and arranged to seal the hole through the crown 6 of a sheet of corrugated metal 7 (Fig. 1) or through the crown of V-crimp metal (Fig. 2), when the nail is driven snugly in place. The lead head is also provided with a downwardly extending peripheral flange 8 which, when the nail is driven in place, is distorted sufficiently to conform to the contour of the surface of the crown of the corrugated material and to snugly engage the material around the nail opening so as to prevent moisture entering therein as long as the nail is held snugly in place.

Figure 6:
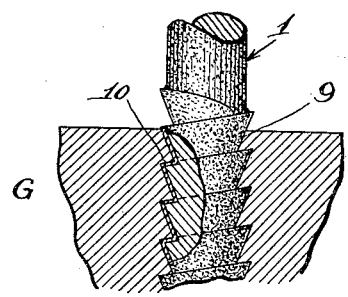
Fig. 6 is an enlarged fragmentary detail of the shank partially in section, better to illustrate the galvanized coating.

The shank of the nail is provided with a low pitch helical groove 9, preferably formed by rolling the shank so that no material is cut away and the original cross sectional strength of the shank is retained. The groove preferably forms a buttress type helical shoulder 10, so that when the nail is driven in place the wood fibers engage over this shoulder as shown in Fig. 6, and the holding power of the nail is thereby greatly increased. The lower surface of the groove forming the shoulder is substantially perpendicular to the axis of the nail and the remaining surface forms a comparatively small angle with the axis of the nail. This provides a long, substantially flat shoulder which may extend completely over that portion of the shank which is driven into the support. It has been found preferable, however, to terminate the shoulder a short distance from the point of the nail to provide a pilot portion 14 as shown. This is somewhat more effective in driving the nails through the metal and also prevents excessive rupturing of the wood fibers. The smooth surface of the angular sides 12 of the groove forces the ends of the fibers outwardly while the nail is being driven without materially breaking or crushing them, and enables their downturned ends to spring outwardly into the groove and engage the shoulders as shown in Fig. 6, thereby providing very great holding power with no tendency for the nail to rotate while being driven, and the lead head therefore remains rigidly fixed to the nail. The nail is preferably provided with a sharp point 15 and may be of hardened material so that corrugated metal may be easily pierced.

It is important that the helical groove 9 should be of sufficiently low pitch so that there will be no tendency for the nail to turn during the process of driving through the metal and into the wooden sheathing. Furthermore, although it has been found that annular non-helical grooves of a contour similar to the helical groove illustrated will provide increased holding power over nails of the prior art, such grooves present difficulties in the process of galvanizing the nails, as the surplus coating does not drain freely. The single continuous elongated groove disclosed in Figs. 1 to 6 inclusive overcomes these difficulties by providing a continuous path for the flow or drainage of the galvanizing material G and causes the material to form a thin, smooth, and substantially uniform coating over the entire surface of the groove, as shown in Fig. 6. At the same time this type of groove does not present any increased resistance to the driving of the nail and materially increases the holding power after it is in place.

As previously stated, this invention particularly contemplates the provision of a nail of the character described. Careful tests have shown that lead head nails made in accordance with the present invention have more than three times the holding power of ordinary high pitch threaded nails and that the lead heads are retained snugly in place. The nails do not ease out but become loosened only when maximum pulling power is applied whereby they break loose entirely from the wood fibers. The factor of safety is so great, however, that they do not become loosened under ordinary conditions of use. In comparative tests, nails with high pitch threads which cause the nails to rotate would ease out under a continuous three hundred pound pull, while the same size nails made in accordance with this invention resist up to one thousand pounds pull without movement and then suddenly "pop" completely out.

The helical groove is preferably comparatively shallow and the cross sectional strength of the nail is not materially weakened, as the material from the groove is merely pressed outwardly to form the shoulder, and the nail retains substantially the same cross sectional area at all points.

Figure 4:
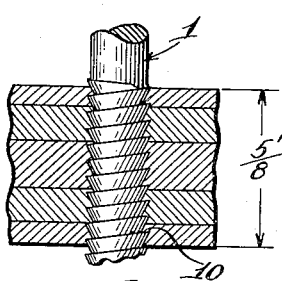
Fig. 4 is a fragmentary view of the nail as used in connection with comparatively thin laminated sheathing.
Figure 5:
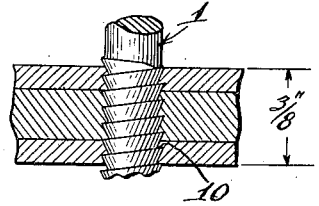
Fig. 5 is similar to Fig. 4 but illustrates the nail as used with very thin laminated sheathing.

Figs. 5 and 6 illustrate the use of the nails in connection with very thin veneered material for which they are particularly adapted, as the long helical shoulder hooks under a maximum number of fibers over its entire length. The fibers are not materially injured by the entering nail, but are merely pressed outwardly by the inclined surface of the groove and their resilience causes them to engage snugly in the groove and over the top of the shoulder. Fig. 4 is an enlarged view drawn to scale of five ply veneer five-eighths of an inch thick, while Fig. 5 is an enlarged scale drawing of three-eighths of an inch three ply veneer.

Figure 7:
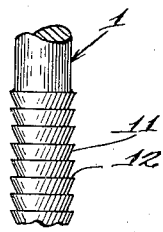
Fig. 7 is a fragmentary detail illustrating a modified form providing annular grooves instead of a single helical groove, which form may effectively be used when the nails are uncoated.

Fig. 7 illustrates a slightly modified form in which annular grooves 11 are formed to provide annular shoulders 12. This form provides increased holding power over nails of the prior art, but is slightly weakened in cross section, thereby reducing the count per pound. This modification is preferably limited to uncoated nails.

The so-called lead-head nails described herein may be similar to the ordinary wire nails well known to the trade and which are provided with the usual wire-nail head to which the lead or other suitable comparatively soft equivalent material is secured.

Modifications will be apparent to those skilled in the art, and it is desired, therefore, that the invention be limited only by the prior art and the scope of the appended claims.

Having thus described my invention, what I claim and desire to secure by Letters Patent is:

1. In a fastener for corrugated metal the combination with a wire nail having a shank and the usual integral wire-nail head, of a lead head snugly embracing said nail head to normally prevent relative movement, and a continuous helical groove in said shank and covering a material portion thereof adjacent the point of said nail, the convolutions of said groove being closely adjacent and of such pitch that the nail will not turn while being driven, said nail having a tapered point, said groove terminating short of said tapered point to provide a cylindrical pilot portion therebetween.

2. In a fastener for corrugated metal the combination with a wire nail having a shank and the usual integral wire-nail head, of a lead head snugly embracing said nail head to normally prevent relative movement, and a helical V-shaped groove in said shank and covering a material portion thereof adjacent the point of said nail, the convolutions of said groove being closely adjacent and of such pitch that the nail will not rotate when driven, said nail having a tapered point, said groove terminating short of said tapered point to provide a cylindrical pilot portion therebetween.

3. In a fastener for corrugated metal the combination with a wire nail having a pointed shank and the usual integral wire-nail head, of a lead head snugly embracing said nail head to normally prevent relative movement, and a helical V-shaped groove in said shank and covering a material portion thereof adjacent the point of said nail, the convolutions of said groove being closely adjacent and of such pitch that the nail will not rotate when driven, the lower side of said V-shaped groove being substantially perpendicular to the axis of said nail to provide a shoulder to resist pulling of the nail, said convolutions terminating short of the point of said shank to provide a cylindrical pilot portion therebetween.

4. In a fastener for corrugated metal the combination with a wire nail having a shank with a sharp tapered point and the usual integral wire-nail head, of a lead head snugly embracing said nail head to normally prevent relative movement, and a helical V-shaped groove in said shank and covering a material portion thereof adjacent the point of said nail, the convolutions of said groove being closely adjacent and of such pitch that the nail will not rotate when driven, the bottom edge of said groove forming a helical shoulder of a diameter slightly greater than the normal diameter of said shank whereby a cross-sectional area through said shank and shoulder is substantially the same as the normal cross-sectional area of said shank and the normal cross-sectional strength of the shank is not materially reduced, said convolutions terminating short of the point of said shank to provide a cylindrical pilot portion therebetween.

5. In a non-rotating nail for the purpose described, the combination with a pointed shank of normally uniform diameter over its length and having an enlarged lead head thereon adapted to conform to the surface against which it is driven, of a helical continuous shoulder on said shank terminating short of said point to provide a pilot of normal shank diameter, said shoulder being formed by forming a groove in said shank and forcing the material from said groove outwardly beyond the normal diameter of said shank, said shoulder being arranged to present minimum resistance to driving and maximum resistance to pulling.

6. In a non-rotating nail for corrugated metal coverings, the combination with a pointed shank having a head thereon and an enlarged lead head completely enclosing said shank head and adapted to conform to the surface against which it is driven, of alternate annular grooves and shoulders on said shank, said shoulders and grooves being arranged to present minimum resistance to driving and maximum resistance to pulling, and a cylindrical pilot portion between said grooves and the point of said shank.

7. In a non-rotating nail for corrugated metal, the combination with a pointed shank having a series of closely adjacent annular shoulders thereon tapering toward the point of said shank and spaced therefrom to provide a pilot portion therebetween, said nail having a relatively thin head integral with said shank, of a comparatively large diameter lead head molded on and completely enclosing said shank head and being cup-shaped to provide an annular sealing rim.

8. In a non-rotating nail for corrugated metal, the combination of an elongated comparatively small diameter shank having a relatively thin head materially larger in diameter than said shank, of a comparatively large lead head completely enclosing said shank head and having a comparatively thin tapered skirt snugly embracing said shank and of sufficient diameter to completely close the hole made by the shank in the corrugated metal, said head having a peripheral annular skirt arranged to conform to the curvature of the corrugated metal when driven in place, said shank having closely adjacent alternate grooves and shoulders over a material portion thereof, the upper surface of said shoulders being substantially perpendicular to the axis of said shank and the surface under the shoulders being tapered toward the point of the nail, said shank having a tapered point and a smooth cylindrical pilot portion between said point and said shoulders, said pilot portion being of slightly smaller diameter than said shoulders.

9. In a nail for corrugated metal the combination with a pointed shank having a relatively thin head integral therewith and a comparatively large diameter lead head completely and snugly enclosing said shank head to prevent relative movement therebetween, of a series of closely adjacent annular shoulders on said shank with their upper surface substantially perpendicular therewith and only slightly larger in diameter than said shank, the outer surface of said shoulders tapering toward the point of said shank to provide V-shaped grooves, said lead head being provided with an annular depending peripheral sealing flange and thin depending sealing skirt closely engaging said shank.

10. In a nail for corrugated metal, the combination with a pointed shank having an integral head and a comparatively large lead head completely enclosing and snugly secured to said shank head and of a contour to completely seal the hole made by said shank, of closely adjacent alternate shoulders and grooves on said shank, said shoulders being substantially perpendicular to the axs of said shank to form substantially V-shaped grooves tapering toward the point of the shank.

11. As an article of manufacture, a fastener comprising a cap of the type of lead adapted to flow upon application of fastening pressure, and a relatively stiff shank to which said cap is affixed, said shank having a cylindrical portion and one or more completely annular ledges facing said cap and of larger diameter than said cylindrical portion to positively interlock with the material into which the fastener is driven and thereby prevent reverse creeping of the shank.

12. A nail comprising a metal shank of cylindrical form having at one end a driving tapering portion, said shank being upset in the form of one or more completely annular ledges at substantially right angles to the axis of the shank and facing away from said portion, each ledge terminating radially outwardly and radially inwardly beyond the normal surface of said shank, whereby, when imbedded in wood or the like, said ledge has substantial holding power without necessitating material weakening of the shank and without unduly increasing the resistance to driving, said nail having at its opposite end a head, and a relatively soft metal member of the type of lead about said head and having a depending central skirt surrounding the adjacent portion of the shank, whereby, when the nail is driven through sheet metal and imbedded in wood or the like, said member forms a substantially continuous annular seal in the hole and from the inner periphery to the outer periphery of the member, said ledge interlocking with the wood to prevent breathing between the sheet metal and the wood, and thereby maintain the seal between the member and the sheet metal.

13. A nail comprising a metal shank of cylindrical form terminating in a driving tapering portion, said shank being upset in the form of completely annular ledges at substantially right angles to the axis of the shank and facing away from said tapering portion, said ledges terminating outward radially beyond the normal surface of said shank and inwardly adjacent said surface, said ledges being substantially spaced apart, whereby said ledges have substantial holding power without necessitating material weakening of the shank and without materially increasing the resistance to driving, said nail having at its opposite end a head, and a relatively soft metal member of the type of lead about said head and having a depending central skirt surrounding the adjacent portion of the shank, whereby, when the nail is driven through sheet metal and imbedded in wood or the like, said member forms a substantially continuous annular seal with the sheet metal from within the hole to the outer periphery of the member, said ledges interlocking with the wood to prevent creeping of the nail and thereby maintain the seal between the member and the sheet metal, the ledge nearest said tapering portion being spaced therefrom in the direction of the head of the nail by a cylindrical section of the shank.

14. As an article of manufacture, a nail adapted to secure sheet metal roofing to wood or the like, said nail comprising a cylindrical relatively stiff metal wire shank terminating at one end in a portion tapering to substantially a point adapted to cut a hole in the sheet metal when the nail is hammered thereinto, said shank terminating at its other end in a head, and a cap of relatively soft metal such as lead, flowable under hammer blows, encasing said head, said cap including a portion under said head and encasing the adjacent portion of said shank to have sealing engagement with the sheet metal throughout an uninterrupted annular area terminating inwardly within said hole, said shank having between said cap and said tapering portion a plurality of completely annular ledges upset from the material of said shank so as to project radially outwardly of the normal cylindrical surface of the wire and facing said cap to thereby interlock with the wood in which the shank is embedded so as to prevent breathing between the wood and the sheet metal, the ledge most remote from the head being located adjacent said tapering portion.

JAMES S. MAZE.